United States Patent
Esfahani et al.

(10) Patent No.: US 6,438,668 B1
(45) Date of Patent: Aug. 20, 2002

(54) METHOD AND APPARATUS FOR REDUCING POWER CONSUMPTION IN A DIGITAL PROCESSING SYSTEM

(75) Inventors: Cameron J. Esfahani, Sunnyvale; Byron W. Pang, Los Gatos; Paul M. Resch, Santa Clara, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/410,192

(22) Filed: Sep. 30, 1999

(51) Int. Cl.[7] .............................................. G06F 12/00
(52) U.S. Cl. ..................... 711/165; 711/162; 711/147
(58) Field of Search ................................ 711/165, 162, 711/147; 713/323

(56) References Cited

U.S. PATENT DOCUMENTS

| | | | | |
|---|---|---|---|---|
| 5,109,521 A | * | 4/1992 | Culley | 711/165 |
| 5,579,522 A | * | 11/1996 | Christeson et al. | 713/2 |
| 5,708,820 A | * | 1/1998 | Park et al. | 395/750 |
| 5,778,443 A | * | 7/1998 | Swanberg et al. | 711/162 |
| 5,822,600 A | * | 10/1998 | Hallowell et al. | 395/750.08 |
| 5,920,728 A | * | 7/1999 | Hallowell et al. | 713/300 |
| 5,931,951 A | * | 8/1999 | Ando | 711/141 |
| 6,154,810 A | * | 11/2000 | Derby et al. | 711/113 |
| 6,209,088 B1 | * | 3/2001 | Reneris | 713/1 |
| 6,243,831 B1 | * | 6/2001 | Mustafa et al. | 714/24 |

FOREIGN PATENT DOCUMENTS

EP         0636983 A1   *   2/1995   ........... G06F/11/14

* cited by examiner

*Primary Examiner*—Matthew Kim
*Assistant Examiner*—Stephen Elmore
(74) *Attorney, Agent, or Firm*—Blakely, Sokoloff, Taylor & Zafman LLP

(57) ABSTRACT

Methods and apparatuses for controlling power consumption in a digital processing system. In one aspect of the invention, an exemplary method includes using a non-volatile memory of the digital processing system (DPS) as a virtual memory of a volatile random access memory (RAM) of the DPS, determining a selection of a reduced power consumption state, storing, in response to the selection and through a virtual memory process, data from the volatile RAM to the non-volatile memory, and reducing power to at least one element of the data processing system after the storing, wherein the storing includes determining whether to store the data to the non-volatile memory by determining if first data previously stored as virtual memory in the non-volatile memory is valid (not dirty) after the selection.

39 Claims, 11 Drawing Sheets

METHOD AND APPARATUS FOR REDUCING POWER CONSUMPTION IN A DIGITAL PROCESSING SYSTEM

FIELD OF THE INVENTION

The present invention relates to the field of digital processing systems, and more particularly to digital processing systems which can enter a reduced power consumption state in a certain operating condition and return to that operating condition by later increasing power consumption in the digital processing system.

BACKGROUND OF THE INVENTION

Digital processing systems, such as computer systems, often include the capability to enter a reduced power consumption state. This is particularly true of portable computer systems such as "laptop" computer systems which may be powered off a portable battery for a period of time. The power available from a battery is often very limited and thus there is a need to control power consumption. It is also desirable to save an operating condition of a computer system when power is reduced. For example, it is desirable to save the operating condition or state which includes the software applications which have been launched and are open and the files/documents which have been opened in those applications and even such details as the position of the cursor within the opened documents. The user may select a reduced power consumption state and then request that the operating condition be saved before entering the reduced power consumption state such that upon resuming operation the prior operating state of the system may be retrieved easily.

One option for a reduced power consumption state is to turn off power to various components including the hard disk, the microprocessor, the display and display drivers while maintaining power to the volatile random access memory (RAM). This state is sometimes referred to as "sleep". One advantage of this state is that since the data is still maintained in the volatile RAM, entering and exiting the state is relatively fast and the user can resume operation from the point the system was at when sleep was entered (e.g. with various files opened and other tasks still present in the operating state of the computer system). However, one limitation with the "sleep" state occurs when the system is powered by a battery and the battery completely loses its power thereby causing all information stored in the RAM to be erased. In this case, valuable data may be lost and the user must restart the system by performing what is referred to as a "cold boot".

Another reduced power consumption state includes a state in which all components of the system are turned off (sometimes referred to as a shutdown state) except for those which constantly receive power (e.g. the system clock and in some cases parameter memory which is powered by a back up battery in certain implementations). If a user desires to be able to return to a certain operating condition when the "off" state was entered then the user must instruct the system to save the state to a non-volatile memory device such as a hard disk drive. In one example of the prior art, all information in the volatile RAM is saved to the hard disk in a separate partition which is controlled by the BIOS routines which are typically stored in a read only memory which itself is non-volatile. Activity may be resumed by reading this data stored on the hard disk and writing it back into the RAM through control of the BIOS.

FIG. 1 shows an example of power consumption control in the prior art which includes the capability of saving the operating condition such that this condition may be retrieved and used to resume use of the computer system. The method 10 of FIG. 1 begins at operation 12 in which it is determined that a selection of a reduced power consumption state has occurred. This may be the selection of a sleep state in which components such as the microprocessor, the display and the hard disk are turned off while the volatile RAM remains powered on or it may involve a state in which all components are turned off (e.g. a "shut down" or an off state). In operation 14, the software and data in the volatile RAM is saved to the hard disk in a separate BIOS controlled partition on the hard disk. This will cause the operating state to be saved by storing all the necessary data from which the state can be recreated. This partition is typically different than the disk operating system partition and may not be user accessible. It appears that the prior art did not use a virtual memory process in saving the software and data in the RAM. In operation 16, the reduced power consumption state is entered by reducing power to the appropriate components depending on the type of reduced power consumption state such as sleep or shut down. It will be appreciated that this sequence of operations often occurs when a user of a laptop computer is warned that the battery power is nearing an exhausted state and thus the user must reduce power to the system before all data is lost. At this point the user may enter the reduced power state (and cause the operating state to be saved) and then obtain a fresh (charged) battery or plug the laptop computer into a wall outlet. After a fresh battery or a wall outlet is obtained, operation 18 may be performed by entering an increased power consumption state. At this point, the data stored to the hard disk may be written back into RAM in order to put the computer system in the prior operating state (e.g. with the various application programs and files opened and being used) which existed when the system entered the reduced power consumption state. Various examples are known in the prior art which show this method and other methods for reducing power consumption and then later being able to return to the prior operating condition which existed when reduced power was selected. See for example U.S. Pat. Nos. 5,778,443 and 5,708,820.

While these prior methods and systems allow a user to resume from the point when reduced power was selected and these systems save all necessary data automatically at a system level as a result of selecting a reduced power state, and while these systems and methods protect the data and the volatile RAM by storing it to a non-volatile memory, such as a hard disk drive, these systems and methods are prone to certain problems. For example, if the user has selected an off state for the reduced power consumption and then changes the hardware of the system by increasing or decreasing the RAM or by changing the hard disk or by changing certain other hardware aspects, and then attempts to resume activity in the last operating state when reduced power consumption was selected, it will often be impossible to resume in the prior operating state without losing data due to the fact that hardware was changed (or it may be impossible to reboot if there is less RAM). Furthermore, a system which attempts to resume activity from a prior stored state which was stored as a result of selecting reduced power consumption state may find that it is impossible to retrieve or resume the prior operating condition for a variety of reasons; for example, if the data is corrupt the system may appear to hang as it continually attempts to recreate the prior operating system. To a user, it would appear as if the system is attempting to resume activity at the prior operating condition but is failing to do so and the user may not be sure what to do with the system. Thus it is desirable to thereby increase the system's reliability when a user has selected a reduced power consumption state and seeks to save a current operating condition of the digital processing system.

SUMMARY OF THE INVENTION

Methods and apparatuses for controlling power consumption in a digital or data processing system, such as a computer system, are described here.

In one aspect of the invention, an exemplary method includes using a non-volatile memory of the digital processing system as virtual memory of a volatile random access memory (RAM) of the digital processing system, and determining a selection of a reduced power consumption state, and storing, in response to the selection and through a virtual memory process, data from the volatile RAM to the non-volatile memory, and reducing power to at least one element of the data processing system after the storing. The storing includes determining whether to store the data to the non-volatile memory by determining if first data previously stored as virtual memory in the non-volatile memory is valid (not dirty) after the selection.

In another aspect in the invention, an exemplary method includes storing, in response to a selection of a reduced power consumption state, data from a volatile RAM of a digital processing system to a non-volatile memory. This data represents a first operating state of the data processing system. Power is reduced to at least one element of the system after the storing operation and power is later increased to the at least one element of the data processing system after the storing in response to a selection of an increased power consumption state. In response to the selection of the increased power consumption state, it is determined whether a hardware change to the data processing system has occurred. In this particular aspect, a virtual memory process may be used to store the data which represents the first operating state.

In another aspect of the invention, an exemplary method includes storing, in response to a selection of a reduced power consumption state, first data, which represents a first operating state of a data processing system, from a volatile RAM of the data processing system to a non-volatile memory of the data processing system. Power is reduced to at least one element of the data processing system after the storing operation and then power is later increased to the at least one element after the storing in response to a selection of an increased power consumption state. In response to the selection of an increased power consumption state, it is determined whether the first operating state can be obtained from the first data stored on the non-volatile memory. The storing of the first data according to this aspect may be through a virtual memory process. In one example according to this aspect, it is determined whether the data processing system is in a looping condition in which the data processing system attempts more than once to achieve the first operating state from the first data. If it is determined that the first operating state cannot be obtained from the first data then the data processing system performs a cold start up operation.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
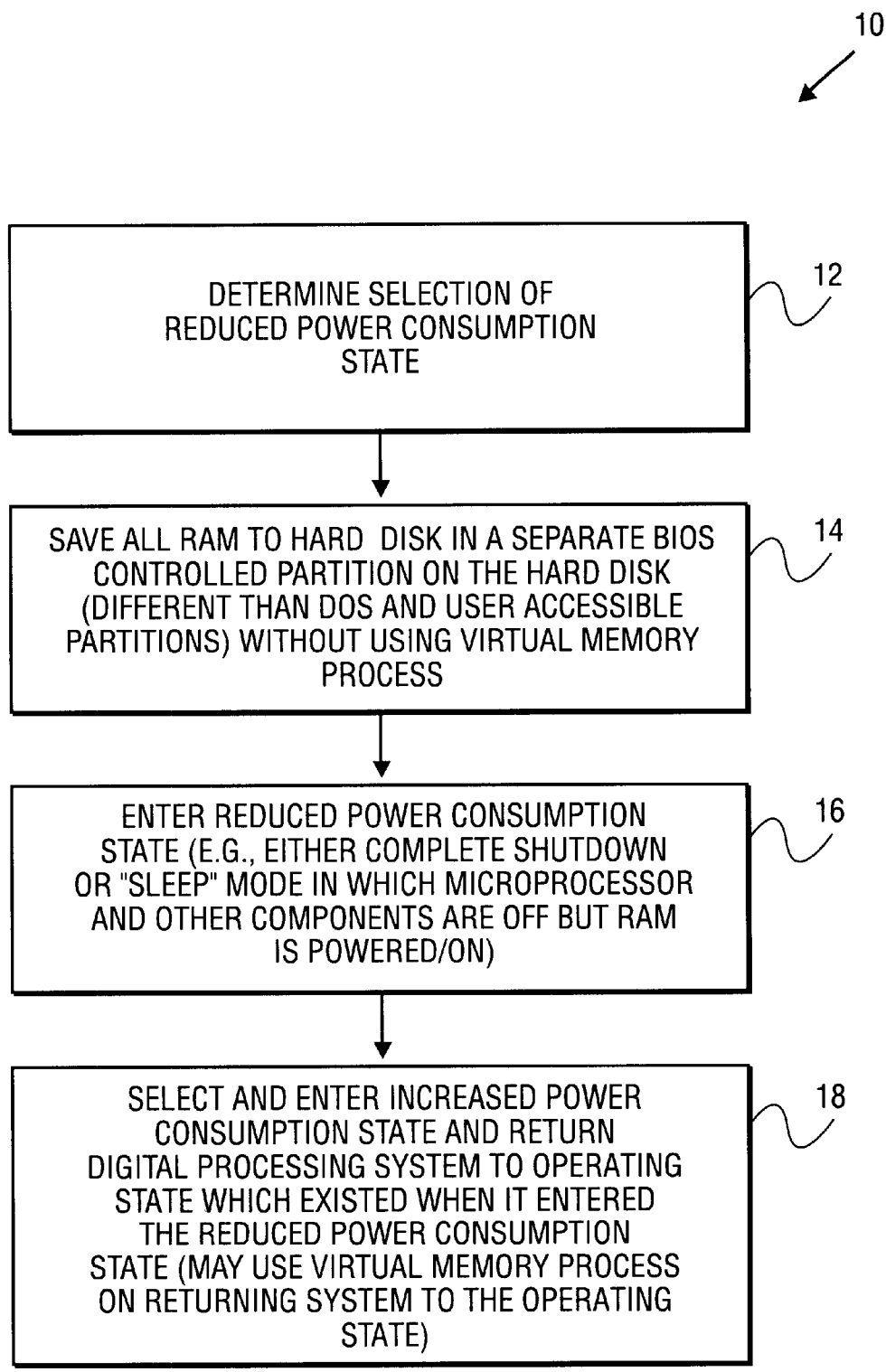
FIG. 1 shows a method for reducing power consumption and resuming operation according to one example of the prior art.
Figure 2:
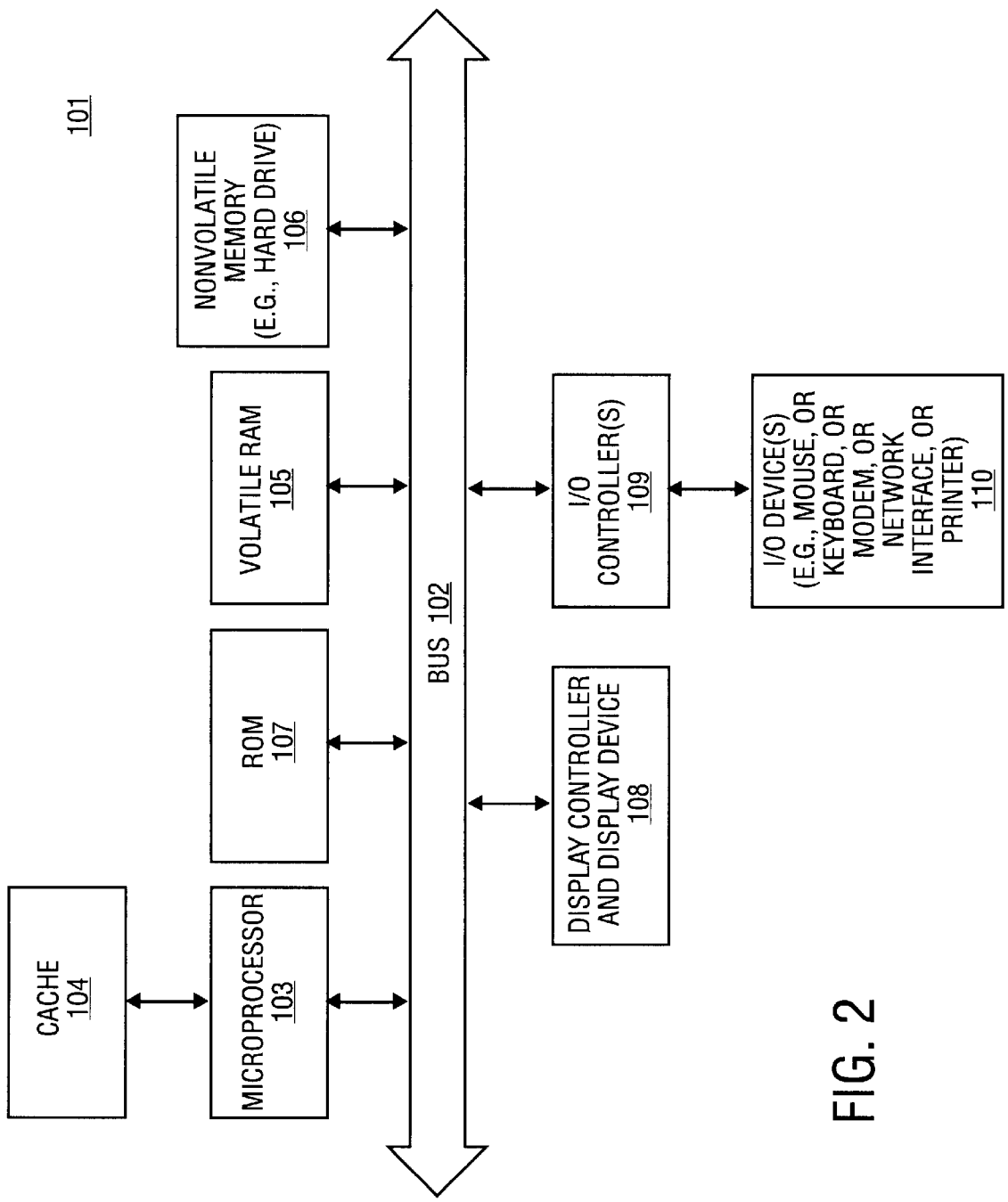
FIG. 2 shows a block diagram example of a data processing system which may be used with the present invention.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 2 may, for example, be an Apple Macintosh computer.

As shown in FIG. 2, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 2. The bus 102 interconnects these various components together and also interconnects these components 103, 107, 105, and 106 to a display controller and display device 108 and to peripheral devices such as input/output (I/O) devices which may be nice, keyboards, modems, network interfaces, printers and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other types of memory systems which maintain data even after power is removed from the system. Typically, the non-volatile memory will also be a random access memory although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 3:
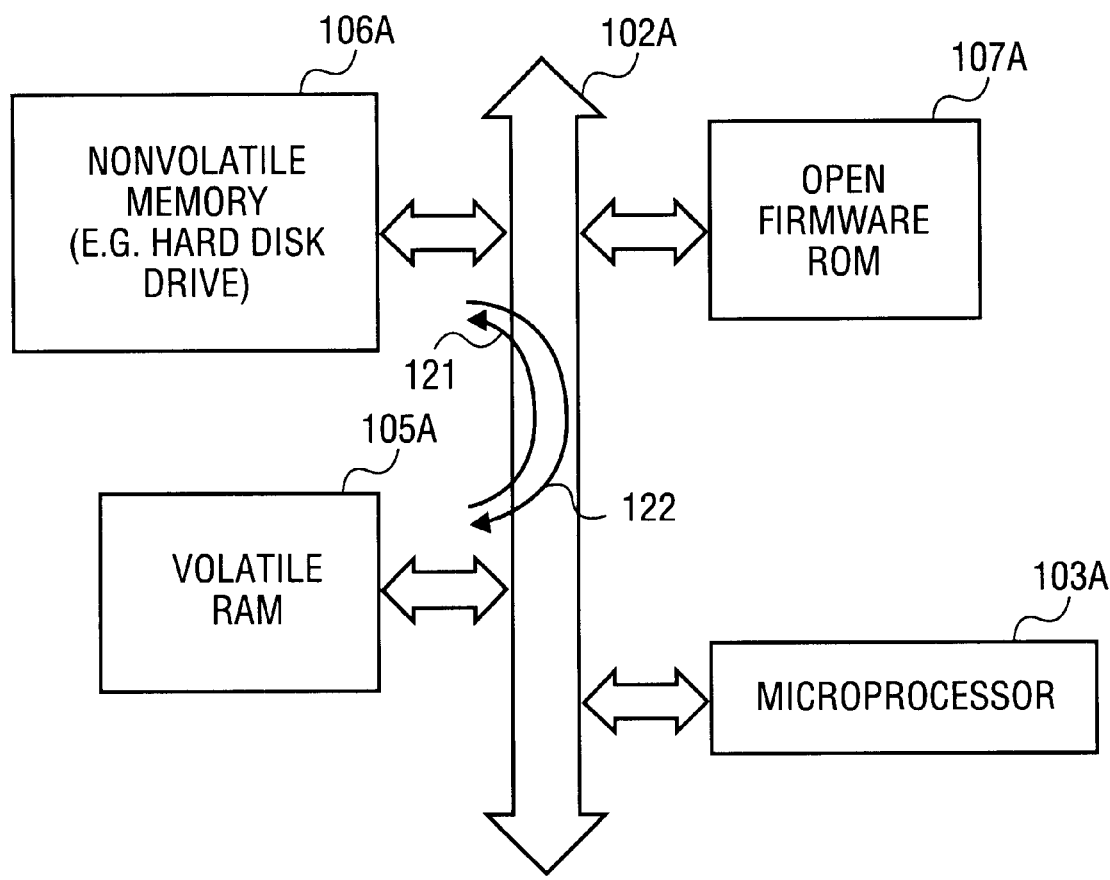
FIG. 3 shows a simplified block diagram of a data processing system according to the present invention.

FIG. 3 shows a simplified example of one embodiment of the present invention. The data processing system shown in FIG. 3 includes a microprocessor 103A which is coupled to volatile RAM 105A, non-volatile memory 106A and Open Firmware ROM 107A through the bus 102A. It can be seen that the microprocessor 103A corresponds to microprocessor 103 of FIG. 2; similarly, RAM 105A, memory 106A and ROM 107A correspond to RAM 105, memory 106 and ROM 107 of FIG. 2. This data processing system allows a user to enter a reduced power consumption state while retaining the current operating state of the data processing system. In response to a user's selection to enter the reduced power consumption state, the microprocessor 103A causes data from the RAM 105A to be written to the non-volatile memory 106A as shown by the arrow 121. Typically, a virtual memory process is used to perform this writing operation such that only pageable (non resident) pages of data which are "dirty" are written from the physical RAM 105A to the non-volatile memory 106A. In this instance, the non-volatile memory 106A serves as virtual memory for the system such that the system's memory includes the volatile RAM 105A and a portion of the non-volatile memory 106A. Since a portion of the non-volatile memory 106A may already contain certain data and software currently in use when the user selects a reduced power consumption state, this data need not be replicated from the volatile RAM 105A when the user selects a reduced power consumption state, such as sleep or shut down. When the user desires to resume activity and thus enter an increased power consumption state the system causes the data written to the non-volatile memory 106A to be written back, in the process 122, to the volatile RAM 105A. This process again typically uses a virtual memory process in certain embodiments. This process 122 also includes in certain embodiments a check for any hardware changes which have occurred to the system since it last entered a reduced power consumption state and in doing so saved its operating state to non-volatile memory 106A, and the process may also include a check for a looping condition or other condition which indicates that it will be impossible to return to the prior operating state of the system. The Open Firmware ROM 107A in conjunction with the microprocessor 103A causes the system to perform these techniques when resuming activity according to the process 122.

The use of a virtual memory process to save the operating state of the system and to restore the operating state provides an advantage that not all of the data in the volatile RAM may need to be saved upon entering reduced power states and not all of the data needs to be retrieved from the non-volatile memory upon exiting reduced power states and thereby resuming activity. However, as is well-known in the art, not all data in the physical RAM 105A or 105 may be written to a virtual memory location on a non-volatile memory device such as 106A or 106. This data is sometimes referred to as resident code or data and sometimes also is referred to as nonpageable data. This resident data includes device drivers, such as the device driver which controls the non-volatile memory 106A or 106 and other low-level software and data which the system requires to be stored in physical RAM such the volatile RAM 105A. In order to fully retain the current operating state of a data processing system when a reduced power state is selected, a hibernation file must be stored onto the non-volatile memory; this hibernation file will contain the resident data and software which could not be paged out to the non-volatile memory through the virtual memory process.

Figure 4:
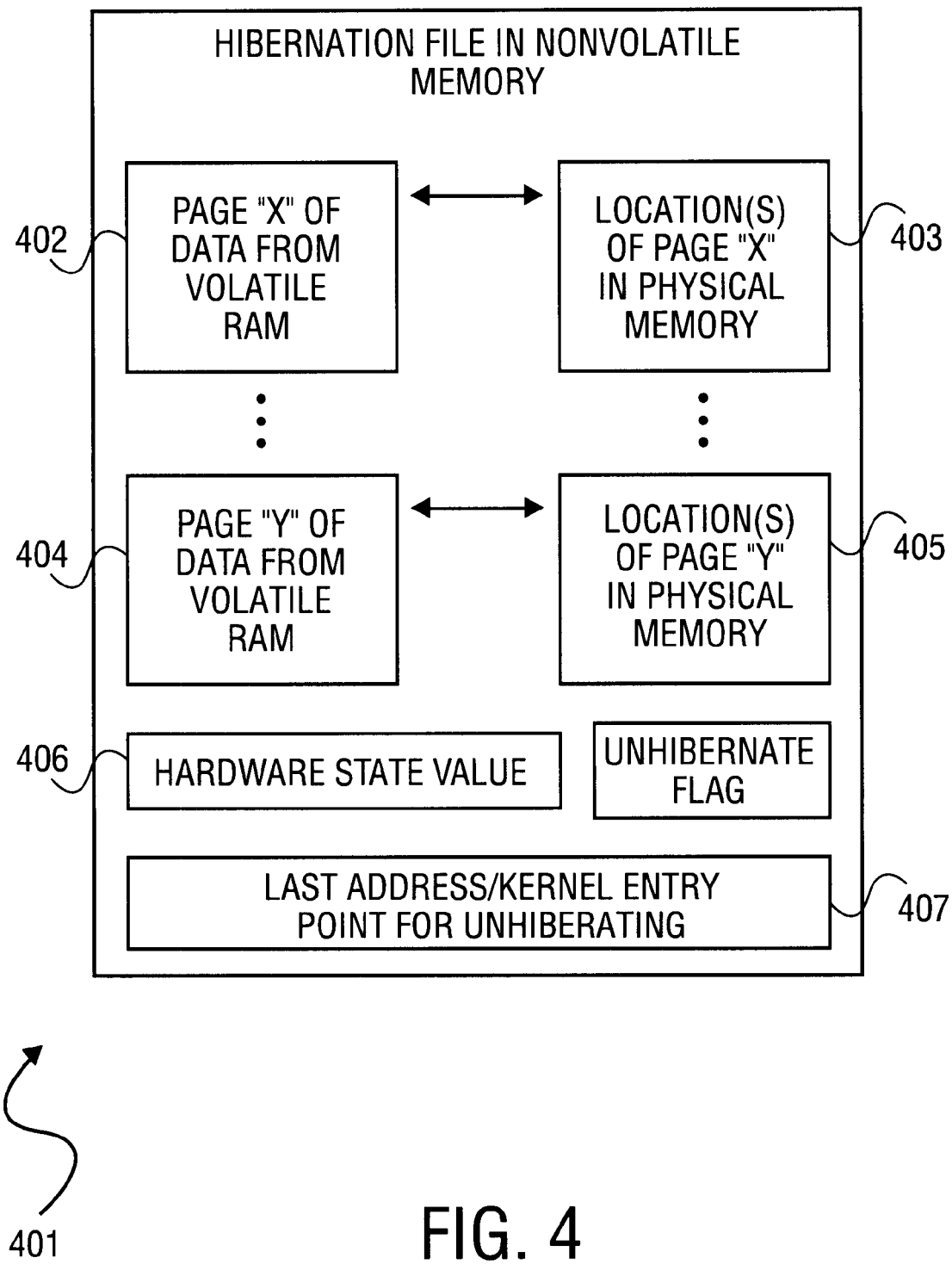
FIG. 4 shows an example of a hibernation file (also referred to as a suspend image file) which is stored in examples of the present invention in a non-volatile memory.

FIG. 4 shows an example of a hibernation file after it has been stored in the non-volatile memory. This file includes the actual data, in this case in a page format such as data 402 and 404 and the respective location or locations of the pages in the physical memory, such as locations 403 and 405 respectively. The hibernation file also includes a hardware value 406 which will be described further below and which represents the current hardware state of the system as it existed when the user selected a reduced power state. The hibernation file 401 also includes data 407 which represents the last address or kernel entry point for unhibernating. This address will be used as a pointer to allow the system to return to the exact operating state (e.g. which software applications were open, and which files/documents were open, the location of the cursor in the various files or documents, etc.). The hibernation file 401 may also include an unhibernate flag which indicates whether it is acceptable to try to unhibernate, that is to return to an increased power state from stored data which determines the prior operating state. In the exemplary methods described below, this flag in conjunction with the hardware state value 406 will be used to determine whether it is possible to unhibernate from the stored data such as the hibernation file 401 which is written to the non-volatile memory after selecting a reduced power consumption state. While FIG. 4 suggests that the pages of data may be stored separately, as an optimization to minimize the amount of disk I/O, the physically contiguous pages of data in RAM may be stored as one range of pages. This allows the one range to be read from volatile RAM and written to disk (e.g. non-volatile memory) with one I/O operation (instead of many I/O's for all of the separate pages).

Figure 5A:
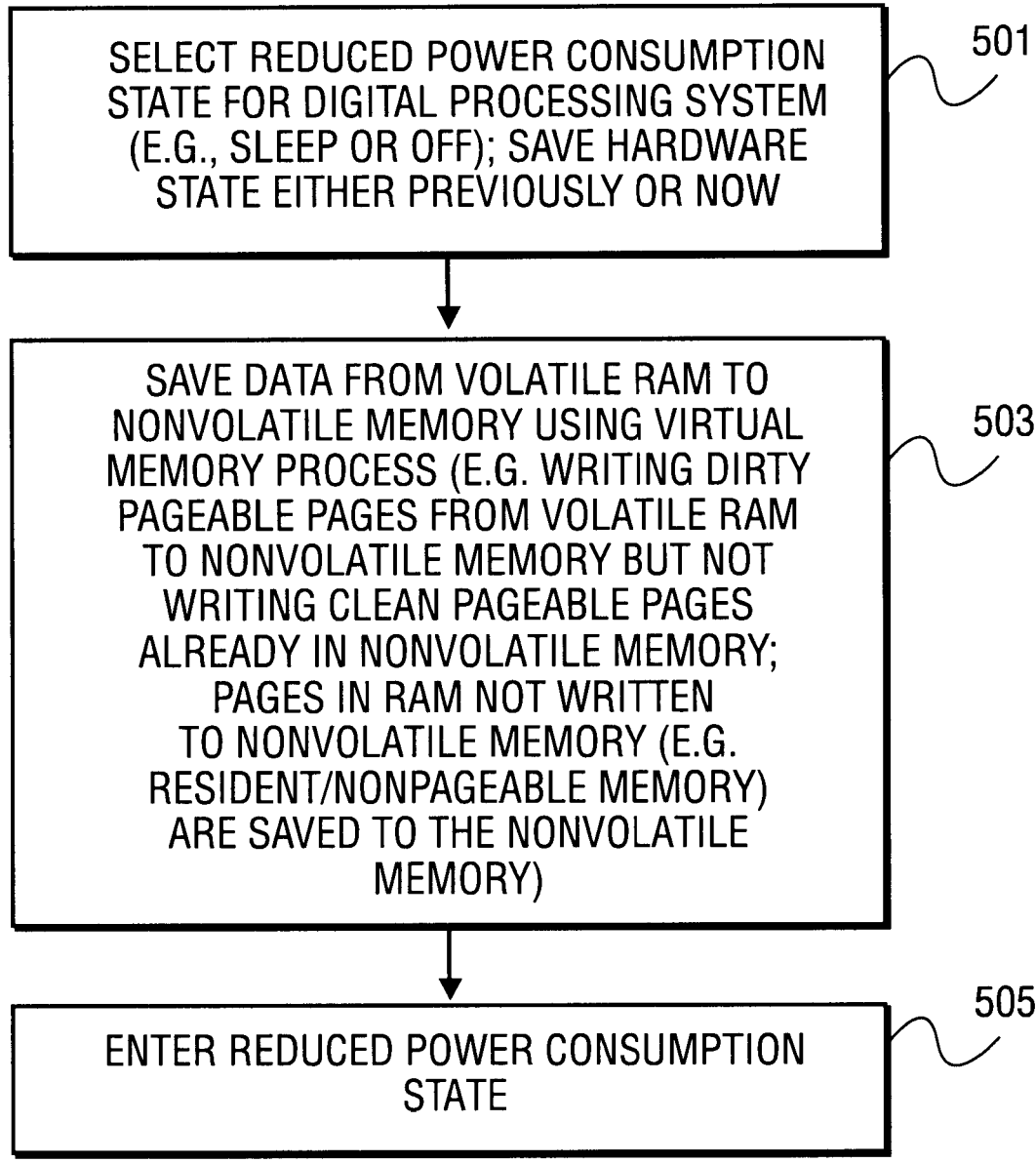
FIG. 5A shows an example of a method according to the present invention for entering a reduced power consumption state while saving data for a operating state. which may be later used to regenerate the operating state.

FIG. 5A shows a simplified example for entering a reduced power consumption state according to the present invention. In operation 501, the user or the system selects a reduced power consumption state. The state may be referred to as sleep which typically means the volatile RAM is powered during the reduced power consumption state while the processor, the hard disk, the display device and perhaps other devices do not receive power during this state. Alternatively, the computer system may be turned off completely. Operation 501 may include the saving of the hardware state although this may be done previously upon initial cold boot up with a data processing system. This hardware state is, in one embodiment, represented by a 32-bit CRC check sum which represents the amount of physical RAM such as RAM 105, an identification of the non-volatile memory 106, such as identification of the harddisk drive, identification of peripherals currently attached to the system and identification of the ROM, such as the ROM 107; it will be appreciated that this hardware state value may represent other hardware parameters as well. The saving of the hardware state in operation 501 will be used later as described below in the process of unhibernating from the reduced power consumption state. In operation 503, data from the volatile RAM such as volatile RAM 105 is saved to a non-volatile memory, such as non-volatile memory 106 using a virtual memory process. In this process, dirty pageable (non-resident) pages from the volatile RAM are written to the non-volatile memory but the "clean" pageable pages already stored in the non-volatile memory are not saved again as part of this virtual memory process. Pages of data in the RAM which have not been written to non-volatile memory and are resident memory pages are saved to the non-volatile memory in a hibernation file, which is also referred to as a suspend image file. Then in operation 505, the data processing system enters a reduced power consumption state such as a sleep mode or a shut down/off mode.

Figure 5B:
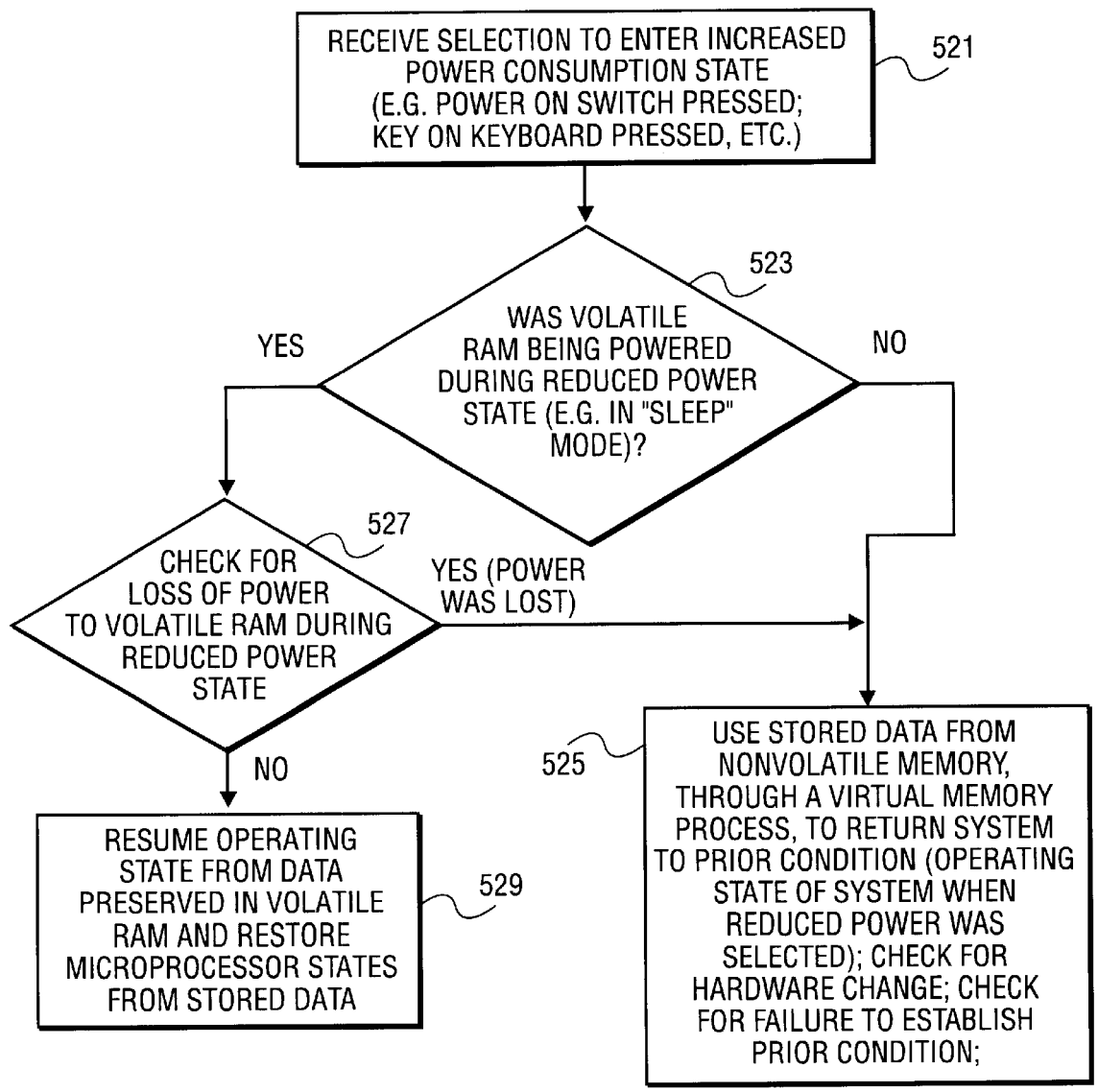
FIG. 5B shows an example according to the present invention of resuming activity by entering an increased power consumption state after having stored data which represents a prior operating state.

FIG. 5B shows a simplified example according to the present invention in which activity on the system is resumed at the prior operating condition or state by using the stored data in the non-volatile memory. Operation 521 determines whether a selection to enter the increased power consumption has occurred. This may be the user pressing on any keyboard key or pressing on the power on switch or it may be a machine controlled selection such as a modem answering a call. In operation 523 it is determined whether the volatile RAM was powered during the reduced power state. When a sleep mode is selected, the volatile RAM will be powered during the reduced power state but when a shutdown or off mode is selected the volatile RAM will not be powered during the reduced power state. Thus, processing if shutdown was selected will proceed to operation 525. On the other hand, if a sleep mode was selected then processing proceeds to operation 527 in which it is determined whether there was a loss of power to the volatile RAM during the reduced power state. If power was lost to the volatile RAM during the reduced power state (e.g. the battery became fully discharged) then processing proceeds to operation 525 which represents an unhibernating operation as described further below. If in operation 527 it is determined that power was not lost, then processing proceeds to operation 529 in which the operation of the system is resumed at its prior operating state from the data preserved in volatile RAM; as is known in the art for this type of resumption, the RAM will include the necessary data to restore the microprocessor states and other states in the data processing system. Operation 529 may represent a conventional resumption from a sleep state in which the volatile RAM was powered while the microprocessor, the display system and the hard drive system were not powered.

Operation 525 is an unhibernating operation in which the prior operating state of the system which existed when reduced power was selected is restored through the use of stored data from the non-volatile memory. In one embodiment, a virtual memory process is used to return the system to the prior operating state. In certain embodiments of the invention, the operation 525 will include two checks which are described further below. These two checks are typically performed before attempting to complete the restoration of the operating state of the system. One check involves examining the current hardware state of the system to determine whether the hardware has been changed by the user while the system was in a reduced power state. The other check determines whether there is a failure to establish the prior operating state, such as a looping condition which makes it impossible to establish the prior operating state from the stored data.

Figure 6A:
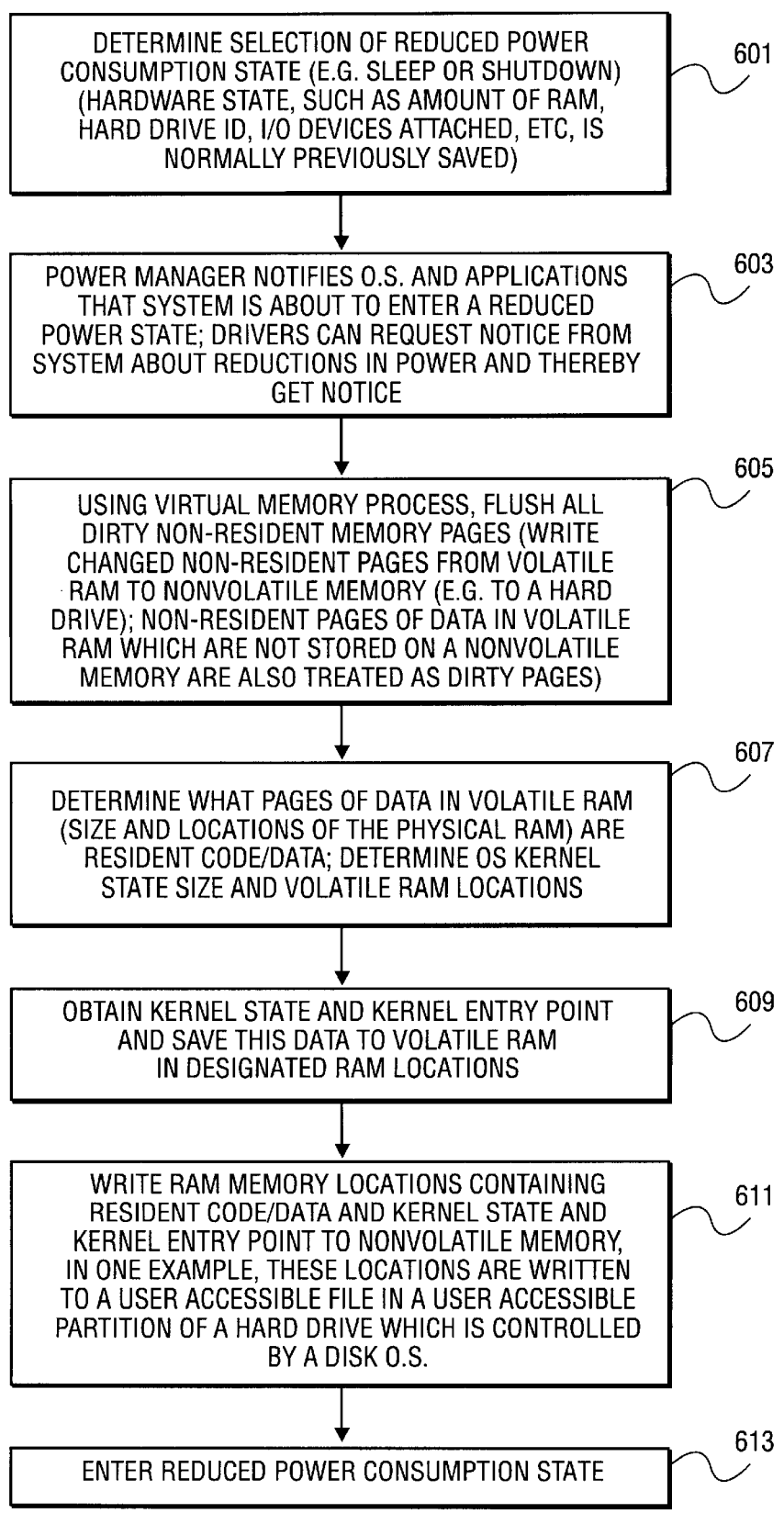
FIG. 6A shows a further example according to the present invention for entering a reduced power consumption state.

FIG. 6A illustrates a more specific example of a method according to the present invention for entering a-reduced power consumption state. In operation 601, it is determined whether a selection of a reduced power consumption state has occurred. The hardware state, such as the amount of RAM, the hard drive's identification number, the I/O devices attached, etc. is normally previously saved but may be saved now if not previously saved. In operation 603, a power manager software notifies the operating system and opened software applications that the system is about to enter a reduced power state. Drivers, such as peripheral device drivers, can request notice from the system about reductions in power and thereby get this notice from the power manager software in order to perform any necessary housekeeping chores for the device. In operation 605, a virtual memory process is used to flush all dirty non resident memory pages to a virtual memory backing store such as to a non-volatile memory 106 shown in FIG. 2. This involves writing all changed non resident pages of data from the volatile RAM to the non-volatile memory. Clean non resident pages in the volatile RAM which are also stored in the non-volatile memory are not saved again to the non-volatile memory thus avoiding the writing operations which would be necessary to save this data if virtual memory were not used. Non resident pages of data in the volatile RAM which have not been previously stored on the non-volatile memory are also treated as dirty pages and are thus saved using the virtual memory process to the non-volatile memory, such as non-volatile memory 106. Then in operation 607, it is determined what pages of data in the volatile RAM are resident software or data. In particular the size and locations of the physical RAM storing the resident software and data are determined. The operating system's kernel state size and the locations in volatile RAM of the associated software of the kernel and its data are also determined. In operation 609, the kernel state and kernel entry point are determined and this data is saved to the volatile RAM in designated RAM locations. Then in operation 611, the volatile RAM memory locations which contain the resident software and data and the kernel state and kernel entry point are saved to the non-volatile memory.

In one example of the present invention, these volatile RAM locations are written to a hibernation file which is a user accessible file in a user accessible partition of a hard disk drive which is controlled by a disk operating system of the data processing system. In one particular example, this user accessible file may be the system file in the system folder maintained by the Macintosh operating system, and this hibernation is included as part of the system file which is user accessible in a user accessible partition maintained by the disk operating system. Then in operation 613 the reduced power consumption state is entered by reducing power to the various components, such as the microprocessor, the hard disk drive and the display device and perhaps other components depending on the level of power reduction which has been selected.

Figure 6B:
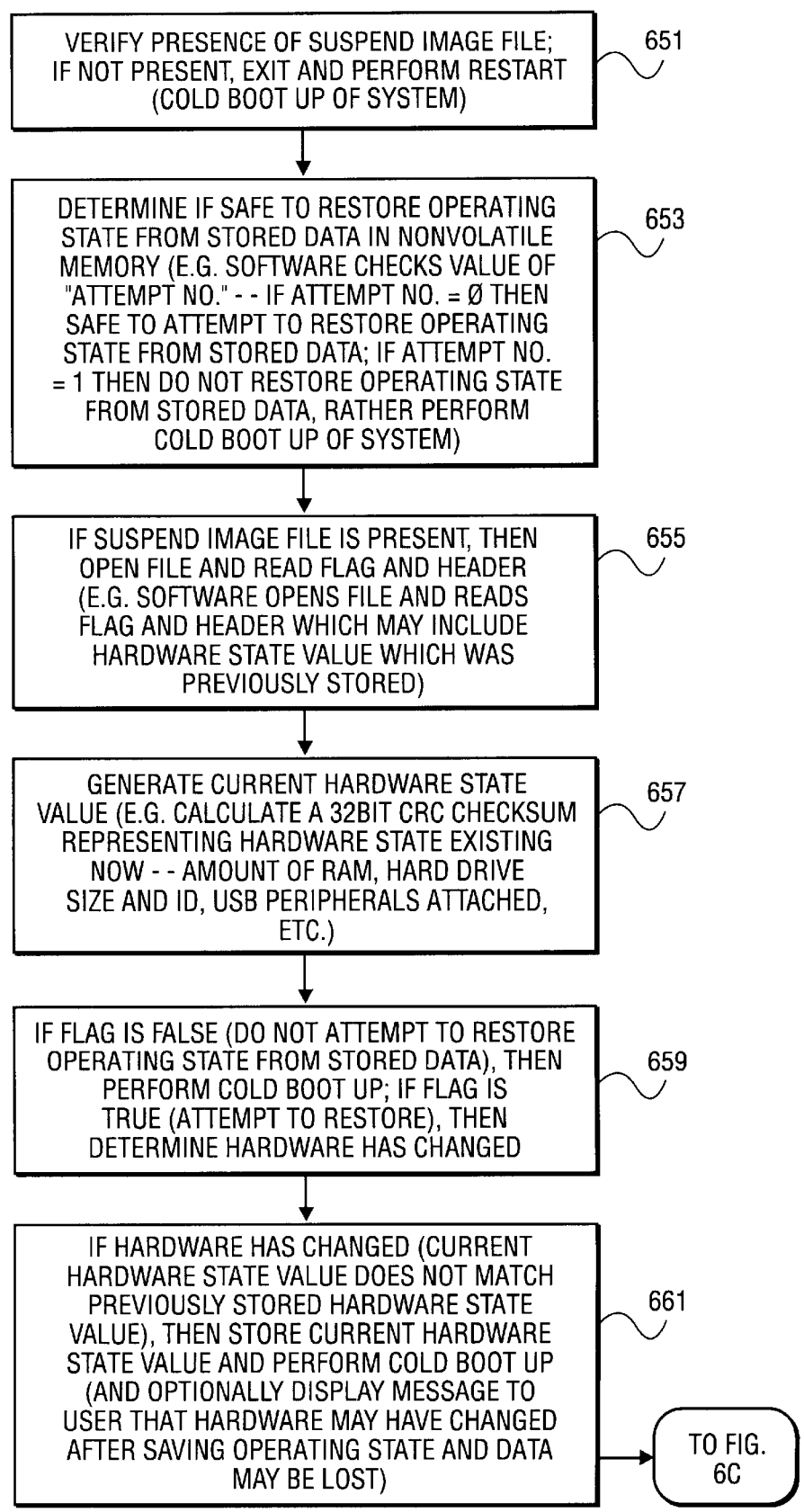
FIGS. 6B and 6C show a further example according to the present invention for returning to an increased power consumption state and using stored data to return to a prior operating state.
Figure 6C:
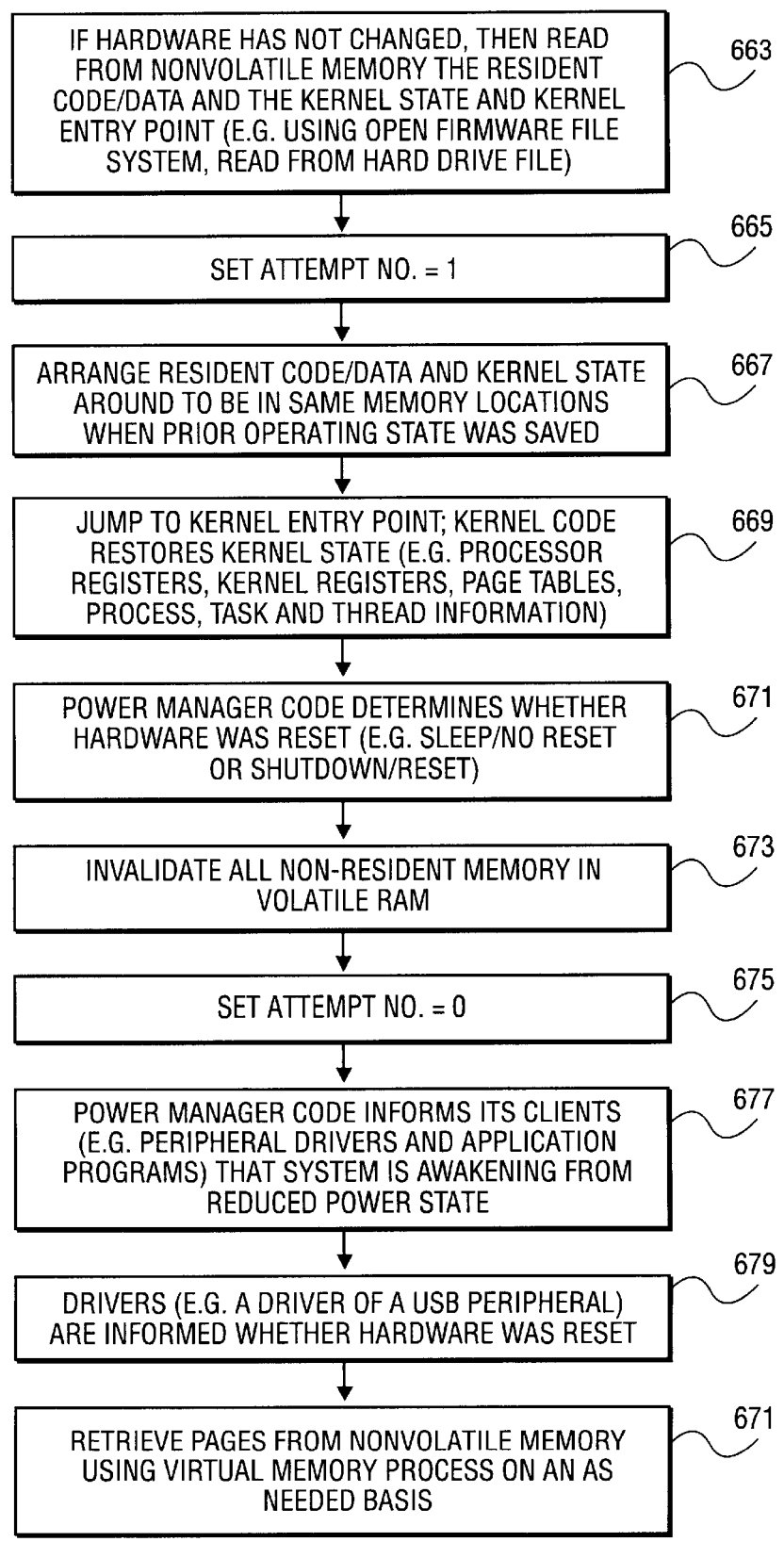

FIG. 6B and FIG. 6C show a more detailed example of a method according to the present invention for returning to a prior operating state through an unhibernating process which uses stored data which has been stored from the volatile RAM, such as RAM 105. The method shown in FIGS. 6B and 6C represents one example of the operation 525 shown in FIG. 5B. This example begins in operation 651 in which it is determined whether a suspend image file, such as a hibernation file exists on a non-volatile memory storage device, such as the non-volatile memory 106. This operation is typically performed by ROM 107 which in one embodiment may contain software, referred to as "Open Firmware ROM software" which generally complies with the Open Firmware standards (IEEE Standard 1275, "Standard For Boot (Initialization, Configuration), Firmware: Core Requirements and Practices", 1994.). One particular example of an Open Firmware ROM is described in co-pending U.S. patent application Ser. No. 09/220,160 which was filed Dec. 23, 1998 and which is entitled "Computer Operating System Using Compressed ROM Image In RAM."

Operation 653 determines if it is safe to attempt to restore the previously saved operating state from the stored data in the non-volatile memory. In one embodiment, the software (e.g. the operating system software in conjunction with the Open Firmware software) which is being executed by the microprocessor checks the value of the parameter "Attempt No.". If the Attempt No. is equal to zero then this indicates that it is safe to attempt to restore the operating state from the stored data. If the Attempt No. is not equal to zero then the system determines that it is not safe to attempt to restore the prior operating state from the stored data thus the system proceeds to perform a cold boot up of the system thereby not using the stored data. In this case, the cold boot up of the system may cause the loss of data.

Figure 7:
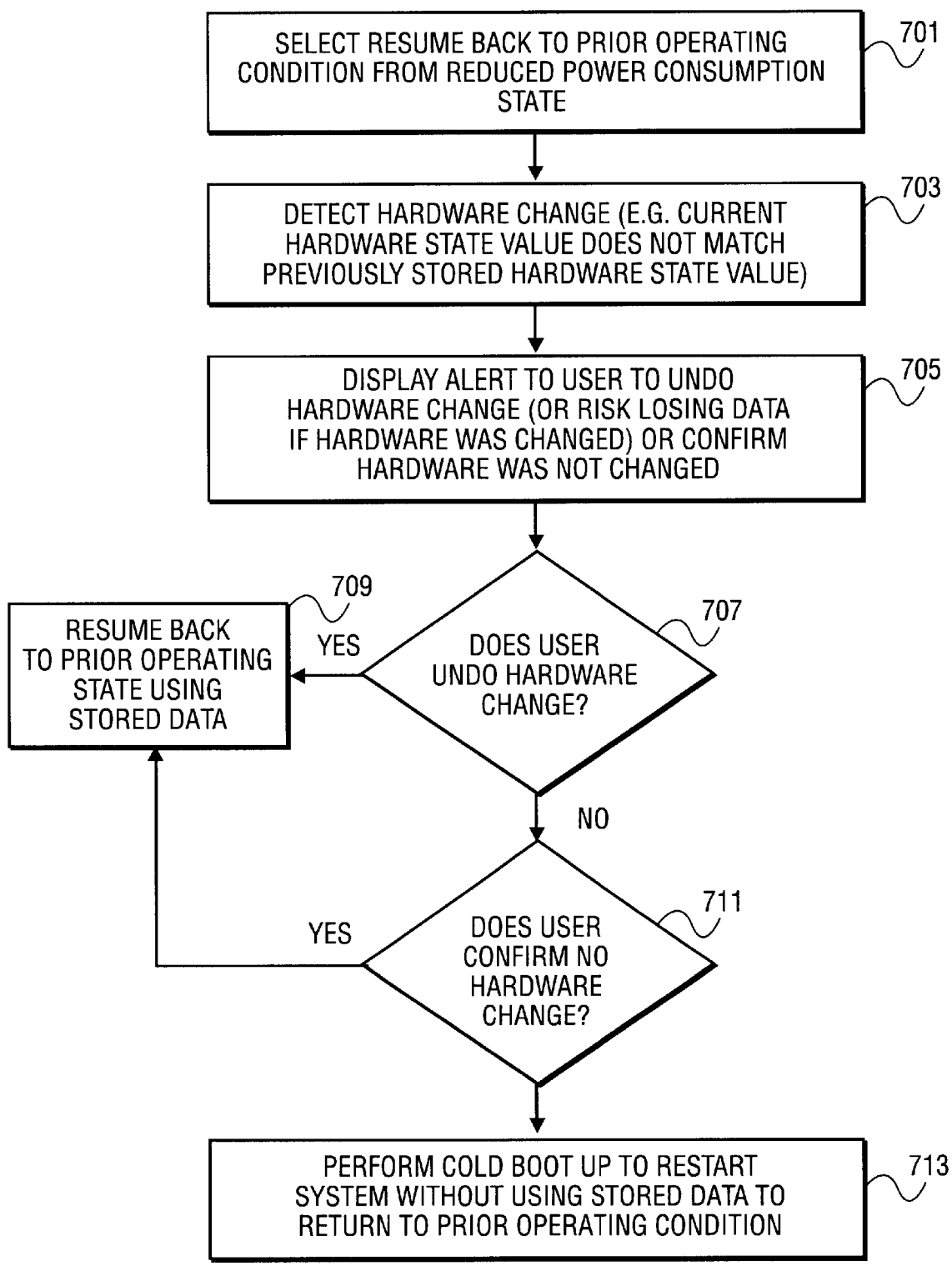
FIG. 7 shows an example of a method according to the present invention for returning to a prior operating condition.

In operation 655, if the suspend image file is present, then software (e.g. the operating system software in conjunction with the Open Firmware software) opens the file and reads the unhibernate flag and reads a header which may include the hardware state value which was previously stored (see operation 601 of FIG. 6A). Then in operation 657, the current hardware state value is generated by examining the current hardware state of the system. The system examines the amount of volatile RAM, the hard drive size and identification number, the identification of peripherals attached and other hardware items and calculates a 32 bit CRC check sum which represents the hardware state. This calculated hardware state will then be compared later to a previously stored hardware state to determine if the hardware has been changed since the system last entered a reduced power reduction state and saved the operating state to the non-volatile memory. In operation 659, the unhibernate flag is checked to determine whether it is "false" which indicates that the system should not attempt to restore the operating state from the stored data. If it is false, then the system performs a cold boot up operation. If the flag is true then the unhibernating method continues to operation 661 in which it is determined whether the hardware has changed since the last time the system entered a reduced power state and saved the operating state to non-volatile memory. If the hardware has changed (which is indicated when the current hardware state calculated in operation 657 does not match the previously stored hardware state value stored in the hibernation file, such as value 406) then the system stores the current hardware state value and performs a cold boot up operation. Optionally, the system may display a message to the user that the hardware may have been changed after saving the operating state of the system and data may be lost. This message gives the user an opportunity to restore the hardware to its prior state (undoing the change). Normally, if this opportunity is exercised, the user would shut down the system upon receiving the message and then undo the change. By undoing the change, the user can prevent the possible loss of data. If the user doesn't care, then they can continue to unhibernate and perhaps lose their data. FIG. 7 will be described below and represents an alternative to operation 661.

If the hardware has not changed, then in operation 663 the resident software and data and the kernel state and the kernel entry point are read from the non-volatile memory and stored into the volatile RAM. In one embodiment, this may be accomplished by the microprocessor executing Open Firmware ROM software and causing, as a result of this execution, the resident software and data and the kernel state and the kernel entry points to be read from the non-volatile memory and written to the volatile RAM, such as RAM 105. Then in operation 665, the Attempt No. variable is set to the value of 1 to indicate that it is not safe to attempt to restore the operating state from the stored data. At this point in the process, the Open Firmware ROM may cause the microprocessor to read additional code from the non-volatile memory which code may be used to perform the operation 667 and the execution of the Open Firmware code is terminated. In operation 667, the resident software and data and the kernel state are arranged to be in the same memory locations as they existed when the prior operating state was saved. Then in operation 669, the system jumps to the kernel entry point and the kernel code executing on the microprocessor restores the kernel state, such as the processor registers, the kernel registers, page tables and information relating to process, task and threads. At this point, in a typical example of the invention, the user's operating system is now in control of the computer and is being executed by the microprocessor. Then in operation 671, the power manager code determines whether the hardware was reset which will depend upon the type of reduced power consumption state which was selected. In one embodiment, if a sleep state was selected then no hardware reset occurred while if a shutdown state was selected, then a hardware reset did occur.

In operation 673, the virtual memory system invalidates all non resident memory in the volatile RAM which will cause a page fault to occur when the system attempts to retrieve data from the invalidated pages (thereby resulting in these pages being read from the non-volatile memory into the volatile RAM in accordance with a conventional virtual memory processes). Then in operation 675, the attempt No. variable is reset to zero so that the system will be able to unhibernate again. In operation 677, the power manager software informs its clients, such as peripheral drivers and application programs, that the system is awakening from a reduced power state. In operation 679, the drivers, such as a driver of a USB peripheral, are informed whether the hardware is reset as determined in operation 671. At this point, the user will see the system as it existed in its prior operating state when a reduced power state was selected. Thus any software applications which were open and the opened documents for those software applications will be displayed. Thus it will appear to the user as if the user has resumed activity from the point when a reduced power state was selected without any change in the system. However, the non resident pages in the volatile RAM will need to be retrieved in operation 681 using the virtual memory process on an as needed basis.

FIG. 7 shows an alternative example of operation 661 of FIG. 6B. The method of FIG. 7 begins in operation 701 in which a selection to resume operation back to the prior operating condition is made. In operation 703, it is detected whether a hardware change has occurred since the entry to the last reduced power consumption state in which the operating state was saved. This may be done by comparing a current hardware state value to a previously stored hardware value (e.g. see operation 601 of FIG. 6A). If a hardware change has been detected in operation 703, then in operation 705, an alert message is displayed to the user asking the user to either discontinue the unhibernate operation and undo the hardware change or proceed to attempt to unhibernate from the stored data thereby risk losing data if the hardware was changed. This alert message may also display an alternative option in which the user is asked to confirm that the hardware has not been changed. Operation 707 determines whether the user selects the option of undoing the hardware change. If the user does select this option then, after the system is shut down (no power) and after the hardware is changed by the user, the system resumes back to the prior operating state using the stored data in operation 709. This operation 709 may be performed by using operations 663–681 of FIG. 6C. If the user chooses not to undo the hardware then it is determined in operation 711 whether the user confirms that no hardware change occurred. If the user does confirm this then operation 709 occurs as shown in FIG. 7. Of course, if the user fails to undo the hardware change or confirms that no hardware change occurred when in fact a hardware change was made then it is likely that data will be lost as it may be impossible to restore the system to the prior operating state in operation 709. If in operation 711 the user did not confirm that no hardware change was made then operation 713 is performed in which a cold boot up of the system is used without using the stored data to return to the prior operating condition. FIG. 7 thus gives the user the opportunity to undo any hardware change. This may be particularly valuable where the stored data represents important information and the loss of that data would therefore be a problem.

Figure 8:
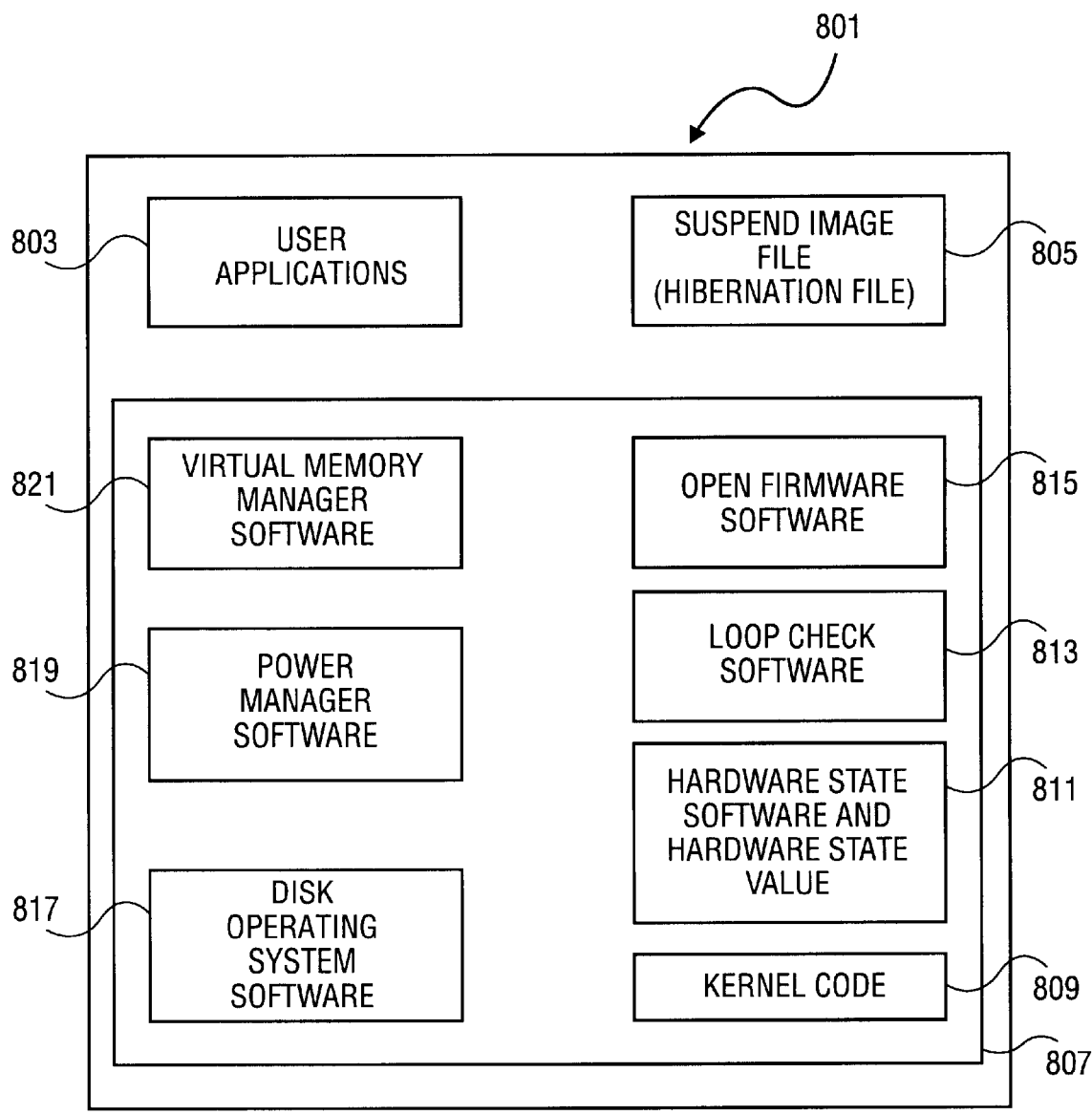
FIG. 8 shows an example of a computer readable media which may be used to store software and data which when executed by a data processing system causes the system to perform various methods of the present invention.

FIG. 8 shows an example of a computer readable media, which may be used with the data processing system according to one embodiment of the present invention. The computer readable media contains data and executable software which when executed in the data processing system such as a digital processing system cause the system to perform the various methods of the present invention. As noted above, this executable software and data may be stored in various places including for example the ROM 107, the volatile RAM 105, the non-volatile memory 106 and/or the cache 104. Portions of this software and/or data may be stored in any one of these storage devices. The media 801 for example may be primarily the volatile RAM 105 and the non-volatile memory 106 in one embodiment. The user applications 803 represent software applications, which are executing on the computer system, such as a word processing application or a spreadsheet application or an Internet web browser application. The suspend image file 805 is the hibernation file, an example of which is shown in FIG. 4. The operating system 807 includes the Open Firmware software 815 which may be stored in the ROM 107 and loaded into RAM 105 at boot up. The loop check software 813 performs the determination of whether it is safe to attempt to restore the prior operating state from the stored data such as the hibernation file. The hardware state software and hardware state value 811 is the software which generates the hardware state value which may be stored with the hibernation file or separately. The kernel code 809 represents the kernel of the operating system and performs numerous tasks, such as operation 669 of FIG. 6C. The virtual memory manager software 821 controls the virtual memory process. This typically involves maintaining a map of page data which represents the state of data in all the virtual memory which includes the physical RAM such as volatile RAM 105 and a portion of the non-volatile memory 106 which has been designated as part of the virtual memory of the system. The virtual memory manager software will be performing conventional virtual memory processes as is known in the art. The power manager software 819 performs the various power managing operations such as notifying applications and the system and drivers of changes to the power consumption state of the system. The software also monitors the state of the battery to determine whether sufficient power exists to continue to operate and displays alerts to the user indicating the status of the battery and the power status of the system. The disk operating system software 817 performs the conventional functions of a disk operating system. This is typically includes controlling the operation of a hard disk drive which in many examples is the non-volatile memory 106 which serves as a virtual memory for the volatile RAM 105.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of reducing power consumption in a digital processing system having a volatile random access memory (RAM) and a non-volatile memory, said method comprising:

using said non-volatile memory as a virtual memory for said volatile RAM;

determining a selection of a reduced power consumption state;

storing in response to said selection and through a virtual memory process, data from said volatile RAM to said non-volatile memory;

reducing power to at least one element of said data processing system after said storing, wherein said storing comprises determining whether to store said data to said non-volatile memory by determining if first data previously stored as virtual memory in said non-volatile memory is valid (not dirty) after said selection.

2. A method as in claim 1 wherein if said first data previously stored as virtual memory in said non-volatile memory is valid after said selection, then a second data in said volatile RAM is not stored to said non-volatile memory after said selection and before said reducing power.

3. A method as in claim 2 wherein if said first data previously stored as virtual memory in said non-volatile memory is not valid after said selection, then said second data is stored to said non-volatile memory after said selection and before said reducing power.

4. A method as in claim 3 wherein said second data replaces said first data on said non-volatile memory.

5. A method as in claim 4 wherein said first data is valid if it matches second data in said volatile RAM after said selection.

6. A method as in claim 5 wherein a table stores at least one bit which indicates whether said first data is valid.

7. A method as in claim 6 wherein said table has at least one bit for a predetermined portion of said volatile RAM and for said predetermined portion of said non-volatile memory.

8. A method as in claim 7 wherein said non-volatile memory is a random access memory on a media which is written to and read from under control of a disk operating system and wherein said storing of said second data is controlled by said disk operating system which stores said second data in a first user accessible file and in a first user accessible partition of said media.

9. A method as in claim 8 wherein resident executable software and data in said volatile RAM is stored to said non-volatile memory as part of said storing in response to said selection and wherein said resident executable software and data are stored on said media in a second user accessible file on a partition of said media which is controlled by said disk operating system.

10. A method as in claim 8 wherein said reducing power to said at least one element comprises one of (a) shutting down said digital processing system such that no power is supplied to said volatile RAM or (b) removing power from selected elements including a processor and selected or input or output units while maintaining power to said volatile RAM.

11. A method of controlling power consumption in a digital processing system having a volatile random access memory (RAM) and a non-volatile memory, said method comprising:
    using said non-volatile memory as a virtual memory for said volatile RAM;
    determining a selection of a reduced power consumption state;
    storing, in response to said selection, data from said volatile RAM to said non-volatile memory, wherein said storing determines whether to store said data to said non-volatile memory by determining if first data previously stored as virtual memory in said non-volatile memory is valid relative to corresponding data in said volatile RAM after said selection;
    reducing power to at least one element of said digital processing system after said storing;
    increasing power to said at least one element after said storing in response to a selection of an increased power consumption state; and
    determining, in response to said selection of said increased power consumption state, whether a hardware change to said digital processing system has occurred.

12. A method as in claim 11 wherein if a hardware change has occurred, said data stored from said volatile RAM to said non-volatile RAM is not used to restore an operating state of said digital processing system which existed before said reducing power and said digital processing system is restarted without retaining said operating state of said digital processing system which existed before said reducing power.

13. A method as in claim 12 wherein said storing, in response to said selection, is through a virtual memory process.

14. A method as in claim 12 wherein if a hardware change has not occurred and a power failure state has occurred after said reducing power, then said data stored from said volatile RAM to said non-volatile RAM is used to restore said operating state of said digital processing system.

15. A method as in claim 11 wherein if said determining determines that a hardware change has occurred, a user of said digital processing system is presented an option to allow said data stored from said volatile RAM to said non-volatile RAM to be used to restore an operating state of said digital processing system which existed before said reducing power.

16. A method of controlling power consumption in a digital processing system having a volatile random access memory (RAM) and a non-volatile memory, said method comprising:
    using said non-volatile memory as a virtual memory for said volatile RAM;
    determining a selection of a reduced power consumption state;
    storing, in response to said selection, first data from said volatile RAM to said non-volatile memory in order to save a first operating state of said digital processing system;
    reducing power to at least one element of said digital processing system after said storing;
    increasing power to said at least one element after said storing in response to a selection of an increased power consumption state; and
    determining, in response to said selection of said increased power consumption state, whether said first operating state of said digital processing system can be obtained from said first data stored on said non-volatile memory, said determining including checking for a looping condition in which said digital processing system attempts more than once to achieve said first operating state from said first data.

17. A method as in claim 16 wherein if said first operating state cannot be obtained from said first data then said digital processing system performs a cold startup operation.

18. A method as in claim 17 wherein said cold startup operation does not use said first data.

19. A method as in claim 17 further comprising:
    determining, in response to said selection of said increased power consumption state, whether hardware change to said digital processing system has occurred.

20. A method as in claim 16 wherein said storing, in response to said selection, of said first data is through a virtual memory process.

21. A method as in claim 20 wherein said storing of said first data determines whether to store said first data to said non-volatile memory by determining if first data previously stored as virtual memory in said non-volatile memory is valid relative to corresponding data in said volatile RAM after said selection.

22. A computer readable media storing executable computer program instructions which when executed on a digital processing system cause said digital processing system, which has a volatile random access memory (RAM) and a non-volatile memory, to perform a method comprising:
    using said non-volatile memory as a virtual memory for said volatile RAM;
    determining a selection of a reduced power consumption state;

storing, in response to said selection and through a virtual memory process, data from said volatile RAM to said non-volatile memory;

reducing power to at least one element of said data processing system after said storing, wherein said storing comprises determining whether to store said data to said non-volatile memory by determining if first data previously stored as virtual memory in said non-volatile memory is valid (not dirty) after said selection.

23. A media as in claim 22 wherein if said first data previously stored as virtual memory in said non-volatile memory is valid after said selection, then a second data in said volatile RAM is not stored to said non-volatile memory after said selection and before said reducing power.

24. A media as in claim 23 wherein if said first data previously stored as virtual memory in said non-volatile memory is not valid after said selection, then said second data is stored to said non-volatile memory after said selection and before said reducing power.

25. A media as in claim 24 wherein said non-volatile memory is a random access memory on a storage media which is written to and read from under control of a disk operating system and wherein said storing of said second data is controlled by said disk operating system which stores said second data in a first user accessible file and in a first user accessible partition of said storage media.

26. A media as in claim 25 wherein resident executable software and data in said volatile RAM is stored to said non-volatile memory as part of said storing in response to said selection and wherein said resident executable software and data are stored on said storage media in a second user accessible file on a partition of said storage media which is controlled by said disk operating system.

27. A media as in claim 25 wherein said reducing power to said at least one element comprises one of (a) shutting down said digital processing system such that no power is supplied to said volatile RAM or (b) removing power from selected elements including a processor and selected or input or output units while maintaining power to said volatile RAM.

28. A computer readable media storing executable computer program instructions which when executed on a digital processing system cause said digital processing system, which has a volatile random access memory (RAM) and a non-volatile memory, to perform a method comprising:

using said non-volatile memory as a virtual memory for said volatile RAM;

determining a selection of a reduced power consumption state;

storing, in response to said selection, data from said volatile RAM to said non-volatile memory, wherein said storing determines whether to store said data to said non-volatile memory by determining if first data previously stored as virtual memory in said non-volatile memory is valid relative to corresponding data in said volatile RAM after said selection;

reducing power to at least one element of said digital processing system after said storing;

increasing power to said at least one element after said storing in response to a selection of an increased power consumption state; and determining, in response to said selection of said increased power consumption state, whether hardware change to said digital processing system has occurred.

29. A media as in claim 28 wherein if a hardware change has occurred, said data stored from said volatile RAM to said non-volatile RAM is not used to restore an operating state of said digital processing system which existed before said reducing power and said digital processing system is restarted without retaining said operating state of said digital processing system which existed before said reducing power.

30. A media as in claim 29 wherein said storing, in response to said selection, is through a virtual memory process.

31. A media as in claim 29 wherein if a hardware change has not occurred and a power failure state has occurred after said reducing power, then said data stored from said volatile RAM to said non-volatile RAM is used to restore said operating state of said digital processing system.

32. A media as in claim 28 wherein if said determining determines that a hardware change has occurred, a user of said digital processing system is presented an option to allow said data stored from said volatile RAM to said non-volatile RAM to be used to restore an operating state of said digital processing system which existed before said reducing power.

33. A computer readable media storing executable computer program instructions which when executed on a digital processing system cause said digital processing system, which has a volatile random access memory (RAM) and a non-volatile memory, to perform a method comprising:

using said non-volatile memory as a virtual memory for said volatile RAM;

determining a selection of a reduced power consumption state;

storing, in response to said selection, first data from said volatile RAM to said non-volatile memory in order to save a first operating state of said digital processing system;

reducing power to at least one element of said digital processing system after said storing;

increasing power to said at least one element after said storing in response to a selection of an increased power consumption state; and determining, in response to said selection of said increased power consumption state, whether said first operating state of said digital processing system can be obtained from said first data stored on said non-volatile memory, said determining including checking for a looping condition in which said digital processing system attempts more than once to achieve said first operating state from said first data.

34. A media as in claim 33 wherein if said first operating state cannot be obtained from said first data then said digital processing system performs a cold startup operation.

35. A media as in claim 34 wherein said cold startup operating does not use said first data.

36. A media as in claim 34 further comprising:

determining, in response to said selection of said increased power consumption state, whether hardware change to said digital processing system has occurred.

37. A media as in claim 33 wherein said storing, in response to said selection, of said first data is through a virtual memory process.

38. A method of controlling power consumption in a digital processing system having a volatile random access memory (RAM) and a non-volatile memory, said method comprising:

determining a selection of a reduced power consumption state;

storing, in response to said selection, data from said volatile RAM to said non-volatile memory, wherein said storing determines whether to store said data to said non-volatile memory by determining if first data previously stored as virtual memory in said non-volatile memory is valid relative to corresponding data in said volatile RAM after said selection;

reducing power to at least one element of said digital processing system after said storing;

increasing power to said at least one element after said storing in response to a selection of an increased power consumption state; and determining, in response to said selection of said increased power consumption state, whether a hardware change to said digital processing system has occurred.

39. A method of controlling power consumption in a digital processing system having a volatile random access memory (RAM) and a non-volatile memory, said method comprising:

determining a selection of a reduced power consumption state;

storing, in response to said selection, first data from said volatile RAM to said non-volatile memory in order to save a first operating state of said digital processing system;

reducing power to at least one element of said digital processing system after said storing;

increasing power to said at least one element after said storing in response to a selection of an increased power consumption state; and determining, in response to said selection of said increased power consumption state, whether said first operating state of said digital processing system can be obtained from said first data stored on said non-volatile memory, said determining including checking for a looping condition in which said digital processing system attempts more than once to achieve said first operating state from said first data.

* * * * *